J. BERGER.
CIRCUIT CLOSER FOR AUTOMOBILE SIGNALS.
APPLICATION FILED SEPT. 12, 1917.

1,290,701. Patented Jan. 7, 1919.

Witness
Chas. W. Stauffiger
Karl H. Butler

Inventor
Joseph Berger
By
Attorneys

UNITED STATES PATENT OFFICE.

JOSEPH BERGER, OF DETROIT, MICHIGAN.

CIRCUIT-CLOSER FOR AUTOMOBILE-SIGNALS.

1,290,701.  Specification of Letters Patent.  Patented Jan. 7, 1919.

Application filed September 12, 1917. Serial No. 190,900.

*To all whom it may concern:*

Be it known that I, JOSEPH BERGER, a citizen of the United States of America, residing at Detroit, in the county of Wayne and State of Michigan, have invented certain new and useful Improvements in Circuit-Closers for Automobile-Signals, of which the following is a specification, reference being had therein to the accompanying drawings.

This invention relates to an automatic direction signal for automobiles and such vehicles as have a steering apparatus, head lights, or lanterns.

The primary object of my invention is to furnish the head lights of an automobile with electric signals, automatically controlled by the steering apparatus of the automobile, to indicate direction of travel to an approaching automobile or pedestrians, thereby avoiding many accidents that would otherwise occur.

A further object of my invention is to provide a signal of the above type that can be easily and quickly installed and is highly efficient for the purposes for which it is intended.

The above and other objects are attained by a mechanical construction that will be hereinafter specifically described and then claimed, and reference will now be had to the drawing wherein—

Figure 1:
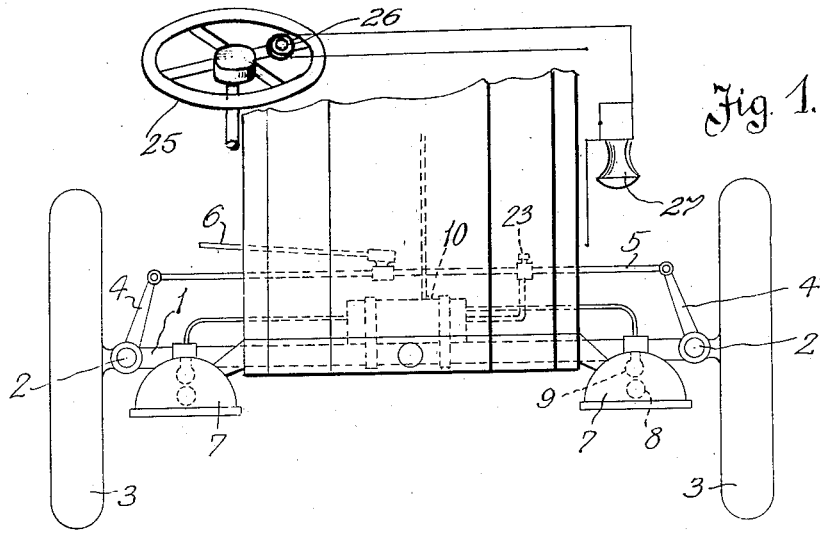
Figure 1 is a plan of a portion of an automobile provided with the signal.
Figure 2:
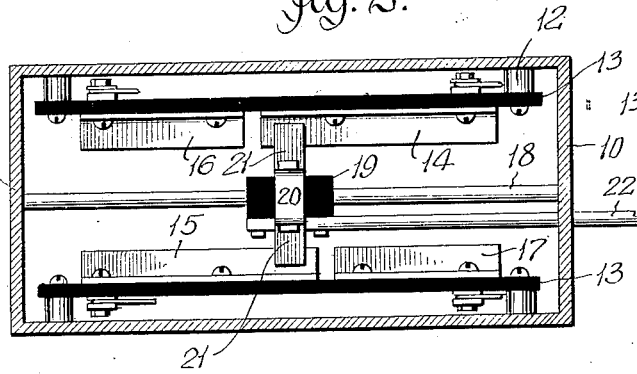
Fig. 2 is a horizontal section of a switch casing.
Figure 3:
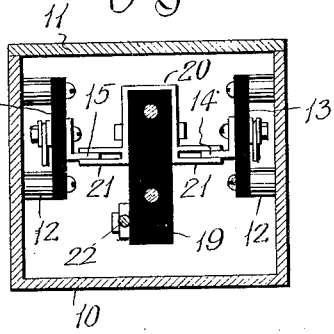
Fig. 3 is a cross sectional view of the switch casing.

In the drawing, the reference numeral 1 denotes the front axle of an automobile and at the ends of the axle are knuckles 2 for front wheels 3, said knuckles having crank portions 4 connected by a rod 5 to which is attached a steering rod 6, the elements thus far described being of a conventional form.

Attached to the axle or a suitable support of the automobile are head lights 7 containing the usual incandescent lamps 8 adapted to be illuminated from a suitable source of electrical energy in connection with the automobile.

In addition to these incandescent lamps there are auxiliary lamps 9 having red globes so as to attract attention when illuminated.

Attached to the axle 1 or a support in proximity thereto is a box like casing 10 having a detachable lid or cover 11. The side walls of the casing 10 are provided with inwardly projecting posts 12 for longitudinal opposed bars of insulation 13 supporting contact members 14, 15, 16 and 17, preferably in the form of angle bars, the member 17 being opposite the member 14, the member 16 opposite the member 15, and the ends of the members 14 and 15 in overlapped or opposed relation.

Connecting the end walls of the casing 10 are parallel bars 18 and slidable on said bars is a block of insulation 19. Fixed on the block of insulation is a strap 20 having bifurcated ends adapted to wipe the contact members 14 to 17 inclusive. The strap 20 and its bifurcated ends 21 constitute a coupling member that may be reciprocated within the casing 10 by a rod 22 extending through an end wall thereof and connected to the block of insulation 19. The outer end of the rod 22 is bent toward the connecting rod 5 and attached thereto, as shown at 23, so that the rods 22 and 5 will be moved in synchronism by the steering mechanism of the automobile.

Figure 4:
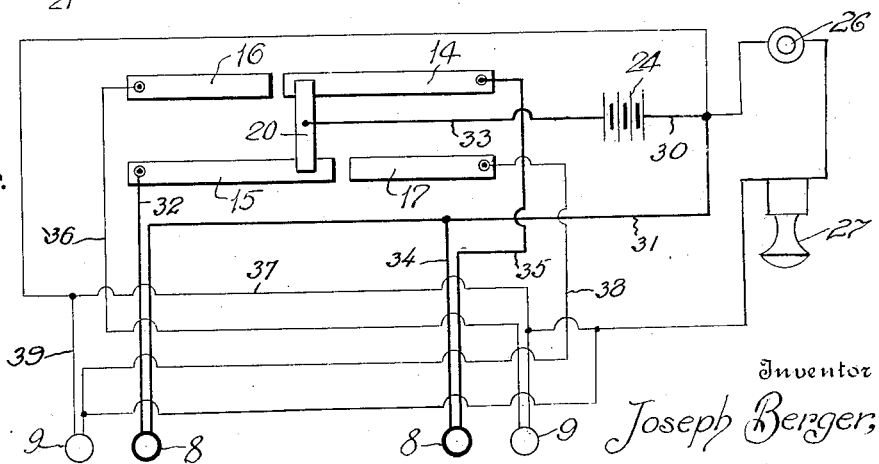
Fig. 4 is a diagrammatic view illustrating the electrical connections of the signal.

Referring to Fig. 4 a suitable source of electrical energy 24, as cells, is shown as electrically connected to the contact members 14 to 17 inclusive and the lamps 8 and 9, the normal circuit for straight way driving being shown by heavy lines, cells 24 by wires 30 and 31 to one of the lamps 8, and by wire 32 to contact member 15, coupling member 20 and wire 33 to the cells 24. The other lamp 8 is connected by wire 34 to wire 31 and by wire 35 to contact member 14, coupling member 20 and wire 33 to the cells. Assuming that the automobile is being steered to the driver's left, the coupling member 20 bridges the contact members 15 and 16 thereby establishing a circuit through the auxiliary lamp 9 in the head light on the left hand side of the machine and a person observing the head light will be immediately aware that the automobile is about to turn to the left. The circuit is as follows:—cells 24 by wire 33 to coupling member 20, contact member 16 by wire 36 to the left hand lamp 9, and by wires 37 and 30 to the cells.

When steering the automobile to the right, the auxiliary lamp on the right hand side of the machine is illuminated by means of the following circuit:—cells 24 by wire 33 to the coupling member 20, contact member 17 by wire 38 to right hand lamp 9 and by wires 39, 37 and 30 to the cells. In consequence of this arrangement a person can readily ascertain in the dark and irrespective of the ordinary lamps the direction the automobile is about to take.

Another feature of my invention is that of using a horn or audible signal which may be sounded simultaneously with the illumination of the red lamps, either when steering or when an automobile is standing still. In Fig. 1 there is shown a steering wheel 25 constituting a suitable support for a push button 26, and a horn 27 is shown as an example of an audible signal. By reference to Fig. 4, it will be observed that the push button 26 and the horn 27 are in circuit with the red lamps 9 and a source of electrical energy, consequently when the push button or switch is operated, one of the red lamps 9 will be illuminated in synchronism with the sounding of the horn or signal. If a number of automobiles are in line, standing still, and one of the automobiles desires to turn into a different lane of travel, when travel is resumed, then the operator of the automobile may press the button and cause one of the lamps to be illuminated and the horn sounded. Others may then observe this particular signaling automobile and thus determine which one in the line desired to change direction of travel when the proper place is reached. Furthermore, when driving an automobile, the operator may sound the horn simultaneously with the illumination of one of the red lamps, all of which contributes to the safety of pedestrians and others.

I attach considerable importance to the fact that the coupling member having a wiping contact with the members 14 to 17 inclusive cannot become accidentally disengaged from said members, due to vibrations of the machine, furthermore, the circuits will always be established irrespective of the degree of rotation on the part of a steering wheel.

It is thought that the utility of my invention will be apparent without further description, and while in the drawing there is illustrated a preferred embodiment of the same, it is to be understood that the structural elements are susceptible to such changes as fall within the scope of the appended claims.

What I claim is:—

1. A circuit closer comprising a casing having side and end walls, insulated contact members supported from the side walls of said casing in a common plane, rods connecting the end walls of said casing and positioned in planes at opposite sides of the plane of said contact members, a coupling member slidable on said rods adapted to bridge said contact members, and a rod extending through one end wall of said casing and connected to said coupling member adapted to slide said coupling member on its rods.

2. A circuit closer comprising a casing having side and end walls, short and long insulated contact members supported from the side walls of said casing in a common plane with the short contact members opposing the long contact members and said long contact members disposed with the inner ends thereof in overlapped opposed relation, rods connecting the end walls of said casing and positioned in planes at opposite sides of the plane of said contact members, a coupling member slidable on said rods adapted to bridge either short and long contact members or said long contact members independent of said short contact members, and a rod extending through one end wall of said casing and connected to said coupling member adapted to slide said coupling member on its rods.

In testimony whereof I affix my signature in the presence of two witnesses.

JOSEPH BERGER.

Witnesses:
KARL H. BUTLER,
ANNA M. DORR.